United States Patent
Sugimoto et al.

(10) Patent No.: US 11,595,661 B2
(45) Date of Patent: Feb. 28, 2023

(54) ENCODING AMOUNT ESTIMATION APPARATUS, ENCODING AMOUNT ESTIMATION METHOD AND ENCODING AMOUNT ESTIMATION PROGRAM

(71) Applicant: NIPPON TELEGRAPH AND TELEPHONE CORPORATION, Tokyo (JP)

(72) Inventors: Shiori Sugimoto, Musashino (JP); Seishi Takamura, Musashino (JP); Atsushi Shimizu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/273,271

(22) PCT Filed: Aug. 26, 2019

(86) PCT No.: PCT/JP2019/033213
§ 371 (c)(1),
(2) Date: Mar. 3, 2021

(87) PCT Pub. No.: WO2020/050075
PCT Pub. Date: Mar. 12, 2020

(65) Prior Publication Data
US 2021/0329253 A1    Oct. 21, 2021

(30) Foreign Application Priority Data

Sep. 5, 2018    (JP) .............. JP2018-166304

(51) Int. Cl.
*H04N 7/12*    (2006.01)
*H04N 19/14*    (2014.01)
(Continued)

(52) U.S. Cl.
CPC ........... *H04N 19/14* (2014.11); *G06K 9/6232* (2013.01); *G06K 9/6243* (2013.01);
(Continued)

(58) Field of Classification Search
CPC .... H04N 19/14; H04N 19/115; H04N 19/172; H04N 19/80; H04N 19/124;
(Continued)

(56) References Cited

U.S. PATENT DOCUMENTS

2010/0088151 A1* 4/2010 Kim .................. G06F 16/50
 705/7.29
2011/0051810 A1* 3/2011 Oami ................ G06F 16/70
 375/240.08

(Continued)

OTHER PUBLICATIONS

Xuan Jing and Lap-Pui Chau, A Novel Intra-Rate Estimation Method for H.264 Rate Control, IEEE International Symposium on Circuits and Systems, May 2006, pp. 5019-5022.
(Continued)

*Primary Examiner* — Gims S Philippe (57) ABSTRACT

A coding amount estimation device includes: a feature vector generation unit that generates a feature vector on the basis of a feature map generated by an estimation target image and at least one filter set in advance; and a coding amount evaluation unit that evaluates a coding amount of the estimation target image on the basis of the feature vector.

15 Claims, 4 Drawing Sheets

(51) Int. Cl.
*H04N 19/115* (2014.01)
*H04N 19/172* (2014.01)
*H04N 19/80* (2014.01)
*G06K 9/62* (2022.01)
*G06V 10/44* (2022.01)

(52) U.S. Cl.
CPC ......... *H04N 19/115* (2014.11); *H04N 19/172* (2014.11); *H04N 19/80* (2014.11); *G06V 10/443* (2022.01)

(58) Field of Classification Search
CPC .... H04N 19/137; H04N 19/85; G06K 9/6232; G06K 9/6243; G06V 10/443
USPC ..................................................... 375/240.08
IPC ....................................................... H04N 19/14
See application file for complete search history.

(56) References Cited

U.S. PATENT DOCUMENTS

| | | | |
|---|---|---|---|
| 2018/0150715 A1* | 5/2018 | Chang | G06K 9/6267 |
| 2019/0043242 A1* | 2/2019 | Risser | G06T 11/001 |
| 2020/0013156 A1* | 1/2020 | Weiss | G06T 7/001 |
| 2020/0034645 A1* | 1/2020 | Fan | G06N 3/0454 |

OTHER PUBLICATIONS

Leon A. Gatys et al., Image Style Transfer Using Convolutional Neural Networks, IEEE Conference on Computer Vision and Pattern Recognition (CVPR), Jun. 2016, pp. 2414-2423.

Bin Xu et al., CNN-Based Rate-Distortion Modeling for H.265/HEVC, 2017 IEEE Visual Communications and Image Processing, Dec. 10, 2017, pp. 1-4.

* cited by examiner

ENCODING AMOUNT ESTIMATION APPARATUS, ENCODING AMOUNT ESTIMATION METHOD AND ENCODING AMOUNT ESTIMATION PROGRAM

CROSS-REFERENCE TO RELATED APPLICATIONS

This application is a 371 U.S. National Phase of International Application No. PCT/JP2019/033213 filed on Aug. 26, 2019, which claims priority to Japanese Application No. 2018-166304 filed on Sep. 5, 2018. The entire disclosures of the above applications are incorporated herein by reference.

TECHNICAL FIELD

The present invention relates to a coding amount estimation device, a coding amount estimation method, and a coding amount estimation program.

BACKGROUND ART

Generally, it is necessary to control, at the time of coding a moving image, a coding amount in accordance with a target bit rate under the constraint of a storage or the band of a transmission network. A general coding device includes a coding amount control mechanism and performs coding amount control in consideration of image quality after coding/decoding and the balance of a generated coding amount.

In H. 264/AVC and H. 265/HEVC that are general standards for coding moving images, a QP (Quantization Parameter) used to quantize the coefficient of DCT (Discrete Cosine Transform) or DST (Discrete Sine Transform) is adjusted to control a generated coding amount. Meanwhile, the omission of a high frequency component with an increase in the QP and a block distortion occurring in a block boundary have an influence on image quality.

In order to adjust a QP, it is necessary to evaluate a generated coding amount in some way.

As the simplest method, a method in which coding is once performed on a moving image and the coding amount is used as an evaluation target is assumed. However, since it is necessary to perform coding again every time a parameter is adjusted according to the method, a calculation cost becomes high. Therefore, there has been a demand for a method for more simply evaluating a generated coding amount. For example, in NPL 1, assuming that a QP and a generated coding amount are in proportion to each other and that the QP and the average value of the gradients between adjacent pixels in a coding target picture are in proportion to each other in the intra picture of H. 264, proportional coefficients for the respective QPs are experimentally calculated in advance to perform coding amount estimation for an arbitrary picture.

CITATION LIST

Non Patent Literature

[NPL 1] X. Jing and L. P. Chau, "A Novel Intra-Rate Estimation Method for H.264 Rate Control", IEEE International Symposium on Circuits and Systems, pp. 5019-5022, May 2006.
[NPL 2] L. A. Gatys, A. S. Ecker, and M. Bethge, "Image Style Transfer Using Convolutional Neural Networks", IEEE Conference on Computer Vision and Pattern Recognition (CVPR), pp. 2414-2423, June 2016.

SUMMARY OF THE INVENTION

Technical Problem

As described above, a generated coding amount has a correlation with an index showing local redundancy such as the gradient between adjacent pixels. Therefore, it is possible to perform coding amount control using the correlation. However, in general coding for moving images, prediction coding such as intra prediction and inter prediction is performed. Therefore, it is possible to perform coding with a low coding amount in many cases even in a case in which local redundancy is not high.

Figure 4:
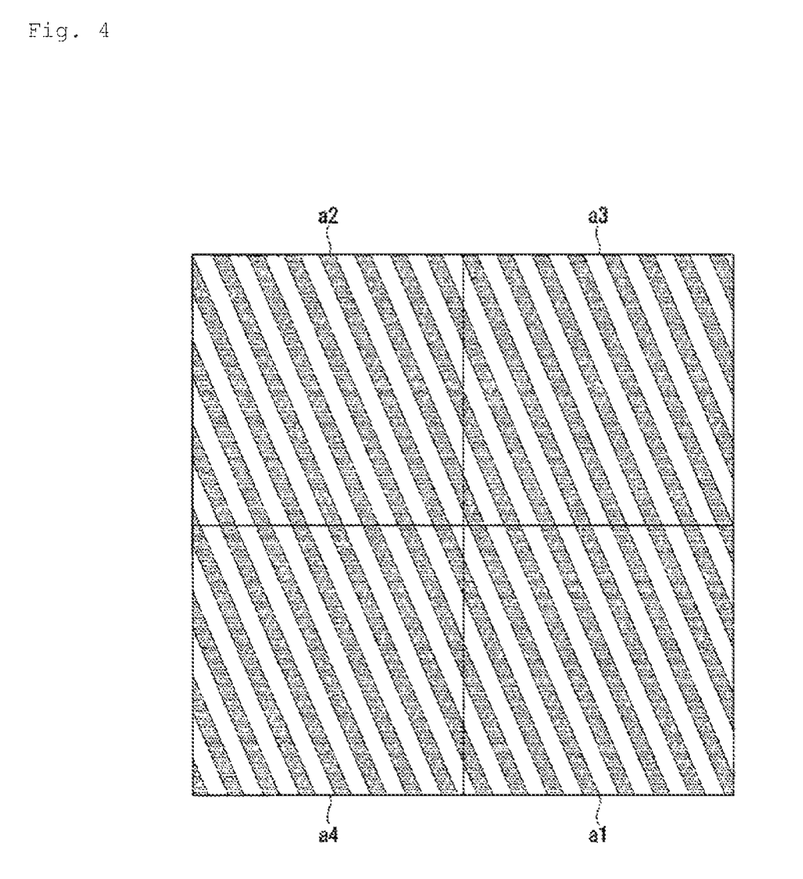
FIG. 4 is a diagram showing an example of a coding target image.

For example, in a lower-right block region a1 of an image shown in FIG. 4, the average value of the gradients between adjacent pixels is high. However, when each of an upper-left block region a2, an upper-right block region a3, and a lower-left block region a4 has been already coded, a coding amount can be efficiently predicted by intra prediction. Therefore, it is actually possible to perform coding with a smaller coding amount than a coding amount estimated by coding amount estimation using the correlation between a generated coding amount and an index showing local redundancy.

Further, when adjustment is performed with a coding amount estimated on the basis of a local feature as a reference, the local feature necessarily reduces on an average with a reduction in the coding amount. As a result, fine texture is entirely lost, and image quality remarkably reduces.

When adjustment is performed with a coding amount estimated on the basis of the local feature of a target image as a reference as described above, there is a problem that a coding amount becomes greater than an actually adjustable coding amount or image quality reduces.

The present invention has been made in view of the above circumstances and has an object of providing a technology capable of estimating a coding amount on the basis of the global feature of a target image.

Means for Solving the Problem

An aspect of the present invention provides a coding amount estimation device including: a feature vector generation unit that generates a feature vector on the basis of a feature map generated by an estimation target image and at least one filter set in advance; and a coding amount evaluation unit that evaluates a coding amount of the estimation target image on the basis of the feature vector.

Further, an aspect of the present invention provides the coding amount estimation device, wherein the feature map is generated by hierarchical convolution processing using the plurality of filters.

Further, an aspect of the present invention provides the coding amount estimation device, wherein the feature vector is generated on the basis of a statistic of the feature map.

Further, an aspect of the present invention provides the coding amount estimation device, wherein the feature vector is generated on the basis of a cross correlation between the feature maps.

An aspect of the present invention provides a coding amount estimation method performed by a coding amount estimation device, the coding amount estimation method including: a feature vector generation step of generating a feature vector on the basis of a feature map generated by an estimation target image and at least one filter set in advance; and a coding amount evaluation step of evaluating a coding amount of the estimation target image on the basis of the feature vector.

An aspect of the present invention provides a coding amount estimation program for causing a computer to function as the coding amount estimation device.

Effects of the Invention

According to the present invention, a coding amount can be estimated on the basis of the global feature of a target image.

DESCRIPTION OF EMBODIMENTS

Embodiments

Hereinafter, a coding amount estimation device according to an embodiment of the present invention will be described.

[Function Configuration of Coding Amount Estimation Device]

Hereinafter, the function configuration of the coding amount estimation device will be described with reference to the drawings.

Figure 1:
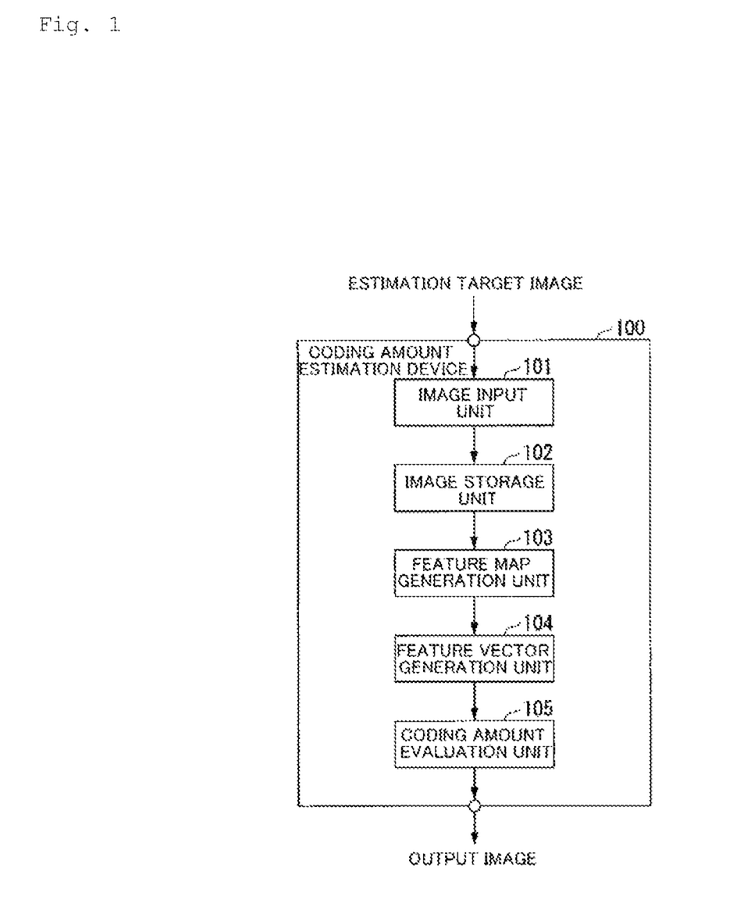
FIG. 1 is a block diagram showing the function configuration of a coding amount estimation device 100 according to an embodiment of the present invention.

FIG. 1 is a block diagram showing the function configuration of a coding amount estimation device 100 according to an embodiment of the present invention.

As shown in FIG. 1, the coding amount estimation device 100 includes an image input unit 101, an image storage unit 102, a feature map generation unit 103, a feature vector generation unit 104, and a coding amount evaluation unit 105.

The image input unit 101 receives the input of an image (hereinafter called an "estimation target image") that is to be subjected to coding amount estimation processing. The image input unit 101 outputs the input estimation target image to the image storage unit 102.

The image storage unit 102 stores an estimation target image input from the image input unit 101. The image storage unit 102 is, for example, a volatile recording medium such as a RAM (Random Access Memory; a readable/writable memory).

The feature map generation unit 103 acquires an estimation target image from the image storage unit 102. The feature map generation unit 103 generates a feature map on the basis of the estimation target image and at least one filter (not shown). The feature map generation unit 103 outputs the generated feature map to the feature vector generation unit 104.

Note that the feature map refers to an image obtained by applying filter processing to an estimation target image through a filter.

Note that the filter used here may be an arbitrary filter. For example, an arbitrary linear or non-linear filter such as an edge extraction filter, a smoothing filter, a sharpening filter, or a statistical filter can be used.

Figure 2:
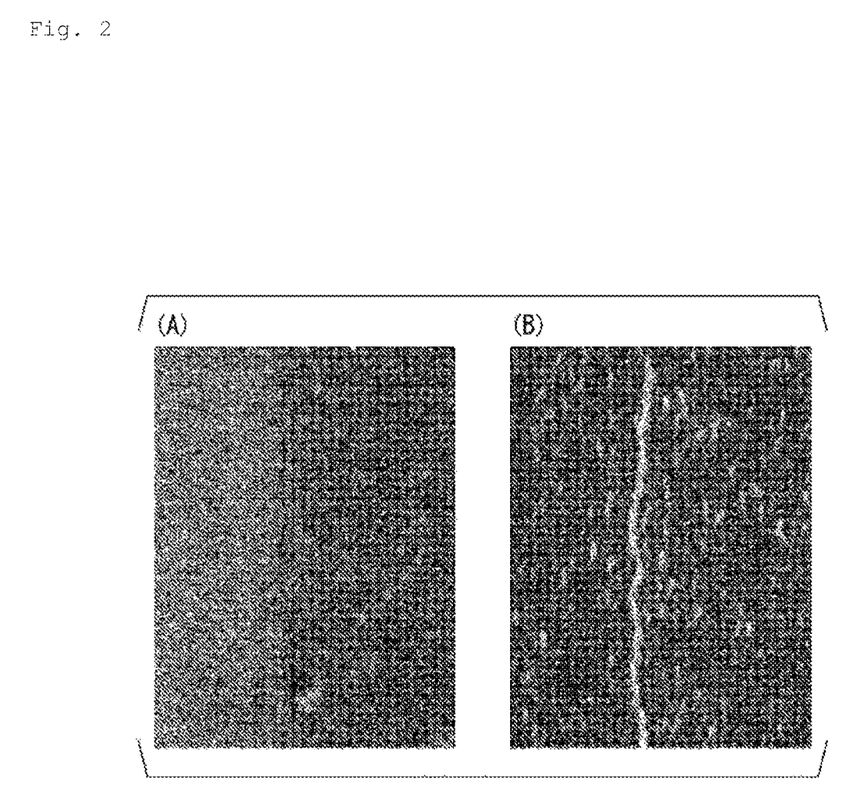
FIG. 2 is a set of diagrams showing an example of an estimation target image and a generated feature map.

FIG. 2 shows an example of an estimation target image and a generated feature map in a case in which an edge extraction filter is used. FIG. 2(A) is an estimation target image obtained by capturing an image of spots of a concrete structure at which cracks have occurred. On the other hand, FIG. 2(B) is a feature map obtained by applying filter processing to the estimation target image of FIG. 2(A) through an edge extraction filter. In a case in which the edge extraction filter is used as described above, the feature map is an image showing spots (edges) of the estimation target image at which brightness (shading) or colors have changed abruptly.

The feature vector generation unit 104 generates a feature vector on the basis of a feature map input from the feature map generation unit 103. The feature vector generation unit 104 outputs the generated feature vector to the coding amount evaluation unit 105.

Note that the feature vector described here refers to a vector value calculated on the basis of data obtained by coding an image corresponding to changing regions of the feature map.

The coding amount evaluation unit 105 evaluates the coding amount of an estimation target image on the basis of a feature vector input from the feature vector generation unit 104 and determines an estimation coding amount. The coding amount evaluation unit 105 outputs the determined estimation coding amount to an external device.

Note that the coding amount of the estimation target image can be evaluated by an arbitrary method.

[Operation of Coding Amount Estimation Device]

Hereinafter, an example of the operation of the coding amount estimation device will be described with reference to the drawings.

Figure 3:
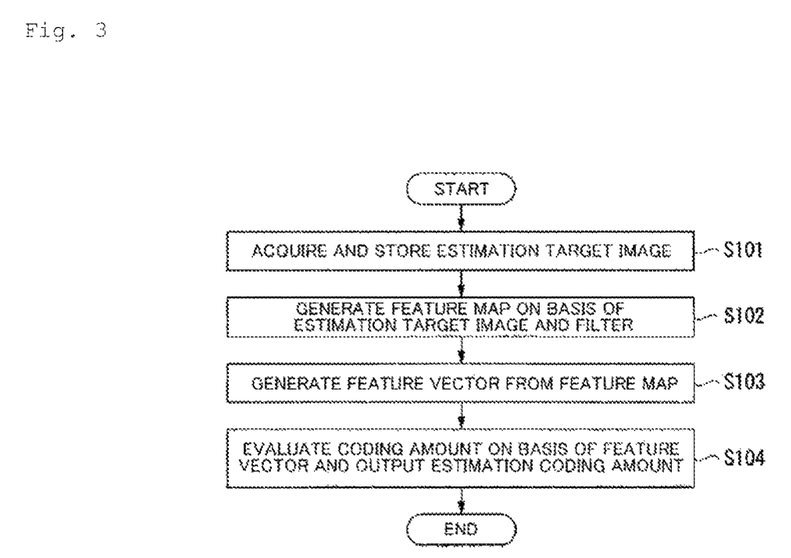
FIG. 3 is a flowchart showing the operation of the coding amount estimation device 100 according to an embodiment of the present invention.

FIG. 3 is a flowchart showing the operation of the coding amount estimation device 100 according to an embodiment of the present invention.

First, the image input unit 101 receives the input of an estimation target image. The image storage unit 102 stores the input estimation target image (step S101).

Next, the feature map generation unit 103 generates at least one feature map on the basis of the estimation target image stored in the image storage unit 102 and at least one filter (step S102).

Note that the filter used in step S102 may be an arbitrary filter as described above. Note that the number of used filters and a combination of used filters are also arbitrarily. For example, information obtained by further applying a non-linear function such as an absolute value, a step function, a sigmoid function, a softsign, and a ramp function to information obtained by applying a linear filter to the estimation target image may be configured to be the feature map.

Note that the feature map does not necessarily have the same resolution as that of the input estimation target image. That is, the feature map may have resolution higher or lower than that of the estimation target image.

Note that the number of the generated feature maps may also be arbitrarily.

Hereinafter, a case in which an estimation target image I is an n×n second-order tensor, m filters $f_i$ are convoluted with respect to the estimation target image I, and information obtained by applying a non-linear function g to each of results is used as a feature map will be described for ease of description.

The i-th feature map $\varphi_i$ is expressed by the following formula (1).

[Formula 1]

$$\phi(I)_i = g(f_i * I) \quad (1)$$

Note that a plurality of arbitrary filters may be further hierarchically applied to a generated feature map to use all or a part of the application results of the filters in respective hierarchies as a feature map. Note that it has been known that, in the respective hierarchies of a feature map obtained by hierarchical filter processing (convolution processing), a higher-order layer reflects a feature related to a detail and a lower-order layer reflects a feature related to the context of an image.

Referring back to FIG. 3, the description will be given again.

Next, the feature vector generation unit 104 generates a feature vector on the basis of the feature map generated by the feature map generation unit 103 (step S103).

Note that in step S103, the feature vector can be generated from the feature map by an arbitrary method.

Note that the feature vector generated on the basis of the feature map may not be a vector but a first-order or higher arbitrary tensor. Hereinafter, a case in which a generated feature vector is a first-order tensor W will be described for ease of description.

As the simplest case, a first-order tensor in which the respective elements of a feature map are arranged can be used as a feature vector. Further, for example, the statistics of a tensor inside feature maps such as an average value, a variance value, a median value, a maximum value, a minimum value, a skewness, and a kurtosis can collectively be used as a feature vector for the respective feature maps.

For example, when an average value is used as a statistic, a feature vector has m elements and the respective elements are expressed by the following formula (2).

[Formula 2]

$$\psi(I)_i = \frac{1}{n \times n} \sum_{j=0}^{n-1} \sum_{k=0}^{n-1} \phi(I)_{i,j,k} \quad (2)$$

Further, for example, when a statistic is calculated for each of elements, the arrangement of the statistics calculated for all the elements can be used as a feature vector.

For example, when an average value is used as a statistic, the feature vector has $n^2$ elements and the respective elements are expressed by the following formula (3).

[Formula 3]

$$\psi(I)_{j \times n + k} = \frac{1}{m} \sum_{i=0}^{m-1} \phi(I)_{i,j,k} \quad (3)$$

Alternatively, a set of Gram matrices generated by the cross correlation between feature maps or a set of the statistics can be used as a feature vector. Note that it has been known that a Gram matrix reflects the global style feature of an image (see NPL 2).

For example, when an average value is used as a statistic, the feature vector has $m^2$ elements and the respective elements are expressed by the following formula (4).

[Formula 4]

$$\psi(I)_{i_1 \times m + i_2} = \frac{1}{n \times n} \sum_{j=0}^{n-1} \sum_{k=0}^{n-1} \phi(I)_{i_1,j,k} \phi(I)_{i_2,j,k} \quad (4)$$

Note that when the correlation between feature maps is high, it is highly likely that the features of the respective feature maps can be efficiently predicted and coded by the same method. In this case, a coding amount is reduced.

Note that other arbitrary methods such as a method in which the randomly-sampled elements of a feature map are arranged to be used as a feature vector and a method in which the elements of a feature map are added and multiplied together on the basis of a prescribed weight coefficient may be used. In this case, a sampling matrix or a weight coefficient may be acquired in advance by learning or may be generated in accordance with a context.

Note that a general feature extraction method for image discrimination or the like can be used as a method for generating a feature map and a feature vector. Note that the number of elements of a feature vector is arbitrarily and may be a scalar value having an element number of 1.

Note that a feature vector may be configured to be generated by calculation based on a feature map and an input estimation target image. For example, a feature map is generated by a moving average filter for each direction, and the difference between the feature map and an input estimation target image is used as a secondary feature map. In this case, the respective elements of the secondary feature map show redundancy in a spatial direction around the elements. The lowest value is selected for each of the elements of the secondary feature map and used as the element of a feature vector, whereby the feature vector reflecting the effect of intra prediction can be generated.

Referring back to FIG. 3, the description will be given again.

Finally, the coding amount evaluation unit 105 evaluates the coding amount of the estimation target image on the basis of the feature vector generated by the feature vector generation unit 104 and outputs an estimation coding amount (step S104). Note that the coding amount of the estimation target image can be evaluated by an arbitrary method. Further, an evaluation value may be the estimation coding amount or any other value correlated with the coding amount. As the simplest method, the weighted linear sum of the respective elements of the feature vector or the like can be, for example, assumed as an evaluation value.

As described above, the coding amount estimation device 100 according to an embodiment of the present invention performs feature extraction on a moving image by filter convolution to generate a feature vector. Then, the coding amount estimation device 100 estimates a coding amount on the basis of the feature vector.

With the above configuration, the coding amount estimation device 100 according to an embodiment of the present invention can estimate a coding amount on the basis of the global feature of a target image.

A part or all of the coding amount estimation device 100 in the embodiments described above may be realized by a computer. In this case, the part or all of the coding amount estimation device 100 may be realized by recording a program for realizing the function on a computer-readable recording medium and causing a computer system to read and perform the program recorded on the recording medium. Note that the "computer system" described here includes hardware such as an OS and peripheral equipment. Further, the "computer-readable recording medium" refers to a transportable medium such as a flexible disk, a magnetic optical disk, a ROM, and a CD-ROM and a storage device such as a hard disk embedded in a computer system. In addition, the "computer-readable storage medium" may include a medium that dynamically retains a program for a short period of time such as a communication line used in a case in which a program is transmitted via a network such as the Internet and a communication circuit such as a telephone circuit, and include a medium that retains a program for a certain period of time such as a volatile memory inside a computer system that serves as a server or a client in that case. Further, the above program may be a program for realizing a part of the functions described above, a program that can realize the functions described above in combination with a program that has been already recorded in a computer system, or a program that is realized by hardware such as a PLD (Programmable Logic Device) and a FPGA (Field Programmable Gate Array).

The embodiments of the present invention are described above with reference to the drawings. However, the above embodiments are given only for illustration, and it is obvious that the present invention is not limited to the above embodiments. Accordingly, the addition, omission, replacement, and other modifications of constituting elements may be performed without departing from the technical idea and spirit of the present invention.

REFERENCE SIGNS LIST

100 Coding amount estimation device
101 Image input unit
102 Image storage unit
103 Feature map generation unit
104 Feature vector generation unit
105 Coding amount evaluation unit

The invention claimed is:

1. A coding amount estimation device comprising:
a non-transitory storage medium configured to store computer program instructions; and
a processor configured to execute the computer program instructions so as to:
receive an estimation target image of a target object;
process the estimation target image via at least one filter to generate a feature map, the at least one filter including a moving average filter;
calculate differences between the feature map and the estimation target image to generate a secondary feature map comprising of elements, where value of a given element indicates redundancy in a spatial direction around the given element;
select lowest values of the elements of the secondary feature map;
generate a feature vector on a basis of the selected lowest values of the elements of the secondary feature map; and
evaluate a coding amount of the estimation target image on a basis of the feature vector to generate an estimation coding amount corresponding to a global feature of the target object.

2. The coding amount estimation device according to claim 1,
wherein the at least one filter is configured by a plurality of filters, and
the processor is configured to generate the feature map by hierarchical convolution processing using the plurality of filters.

3. The coding amount estimation device according to claim 1,
wherein the processor is configured to generate the feature vector on a basis of a statistic of the feature map.

4. The coding amount estimation device according to claim 1,
wherein the processor is configured to generate a plurality of feature maps; and
the processor is configured to generate the feature vector on a basis of cross correlation between the plurality of feature maps.

5. The coding amount estimation device according to claim 1,
wherein the target object is a surface state of a concrete structure.

6. A coding amount estimation method for causing a processor to execute a process, the coding amount estimation method comprising executing on the processor the steps of:
receiving an estimation target image of a target object;
processing the estimation target image via at least one filter to generate a feature map, the at least one filter including a moving average filter;
calculating differences between the feature map and the estimation target image to generate a secondary feature map comprising of elements, where value of a given element indicates redundancy in a spatial direction around the given element;
selecting lowest values of the elements of the secondary feature map;
generating a feature vector on a basis of the selected lowest values of the elements of the secondary feature map; and
evaluating a coding amount of the estimation target image on a basis of the feature vector to generate an estimation coding amount corresponding to a global feature of the target object.

7. The coding amount estimation method according to claim 6,
wherein the at least one filter is configured by a plurality of filters, and
the processor is configured to generate the feature map by hierarchical convolution processing using the plurality of filters.

8. The coding amount estimation method according to claim 6,
wherein the processor is configured to generate the feature vector on a basis of a statistic of the feature map.

9. The coding amount estimation method according to claim 6,
wherein the processor is configured to generate a plurality of feature maps; and
the processor is configured to generate the feature vector on a basis of a cross correlation between the plurality of feature maps.

10. The coding amount estimation method according to claim 6,
wherein the target object is a surface state of a concrete structure.

11. A coding amount estimation program product embodying computer program instructions on a non-transitory computer-readable medium for causing a computer to execute a process by a processor so as to perform the steps of:

receiving an estimation target image of a target object;

processing the estimation target image via at least one filter to generate a feature map, the at least one filter including a moving average filter;

calculating differences between the feature map and the estimation target image to generate a secondary feature map comprising of elements, where value of a given element indicates redundancy in a spatial direction around the given element;

selecting lowest values of the elements of the secondary feature map;

generating a feature vector on a basis of the selected lowest values of the elements of the secondary feature map; and evaluating a coding amount of the estimation target image on a basis of the feature vector to generate an estimation coding amount corresponding to a global feature of the target object.

12. The coding amount estimation program product according to claim 11,
wherein the at least one filter is configured by a plurality of filters, and
the processor is configured to generate the feature map by hierarchical convolution processing using the plurality of filters.

13. The coding amount estimation program product according to claim 11,
wherein the processor is configured to generate the feature vector on a basis of a statistic of the feature map.

14. The coding amount estimation program product according to claim 11,
wherein the processor is configured to generate a plurality of feature maps; and
the processor is configured to generate the feature vector on a basis of a cross correlation between the plurality of feature maps.

15. The coding amount estimation program product according to claim 11,
wherein the target object is a surface state of a concrete structure.

* * * * *